United States Patent
Li et al.

(10) Patent No.: US 11,792,098 B2
(45) Date of Patent: Oct. 17, 2023

(54) LINK DETECTION METHOD AND SYSTEM

(71) Applicant: INSPUR SUZHOU INTELLIGENT TECHNOLOGY CO., LTD., Jiangsu (CN)

(72) Inventors: Qi Li, Jiangsu (CN); Lianpin Zhang, Jiangsu (CN); Shaozheng Hou, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/927,344

(22) PCT Filed: Jan. 23, 2021

(86) PCT No.: PCT/CN2021/073447
§ 371 (c)(1),
(2) Date: Nov. 22, 2022

(87) PCT Pub. No.: WO2021/238263
PCT Pub. Date: Dec. 2, 2021

(65) Prior Publication Data
US 2023/0198874 A1 Jun. 22, 2023

(30) Foreign Application Priority Data
May 29, 2020 (CN) .......................... 202010476918.9

(51) Int. Cl.
*G06F 15/173* (2006.01)
*H04L 43/0811* (2022.01)
*H04L 41/12* (2022.01)

(52) U.S. Cl.
CPC .......... *H04L 43/0811* (2013.01); *H04L 41/12* (2013.01)

(58) Field of Classification Search
CPC ............................. H04L 43/0811; H04L 41/12
See application file for complete search history.

(56) References Cited

U.S. PATENT DOCUMENTS

| 2008/0126492 | A1* | 5/2008 | Guidi | H04L 43/103 |
| | | | | 709/206 |
| 2015/0092561 | A1 | 4/2015 | Sigoure | |
| 2020/0344120 | A1* | 10/2020 | Pianigiani | H04L 41/0806 |

FOREIGN PATENT DOCUMENTS

| CN | 101277214 A | 10/2008 |
| CN | 107294760 A | 10/2017 |

(Continued)

OTHER PUBLICATIONS

NPL, "Overview of Keepalive Mechanisms on Cisco IOS—Cisco", Dec. 17, 2014 (Year: 2014).*
PCT/CN2021/073447 international search report.

*Primary Examiner* — Padma Mundur
(74) *Attorney, Agent, or Firm* — IPRO, PLLC

(57) ABSTRACT

A link detection method includes: a server-side program acquiring connection relationships between a service interface of a TOR switch and service interfaces of various servers; the server-side program periodically sending a query message to each client-side program by means of a network management switch; in response to the query message, each client-side program returning, to the server-side program and by means of the network management switch, interface information of a service interface, which is included in a TOR switch or a server at which each client-side program is located and has connection relationships with service interfaces of other devices; and the server-side program reporting, to an upper-layer program, interface information of a service interfaces of the other devices, and the received interface information, such that the upper-layer program analyzes, on the basis of the interface information, (Continued)

connection situation of links for realizing corresponding connection relationships.

14 Claims, 3 Drawing Sheets

(56) References Cited

FOREIGN PATENT DOCUMENTS

| CN | 109951325 A | 6/2019 |
|---|---|---|
| CN | 111740877 A | 10/2020 |

* cited by examiner

LINK DETECTION METHOD AND SYSTEM

The present application claims the priority of the Chinese patent application filed on May 29, 2020 before the CNIPA, China National Intellectual Property Administration with the application number 202010476918.9 and the title of "LINK DETECTING METHOD AND SYSTEM", which is incorporated herein in its entirety by reference.

FIELD

The present disclosure relates to the technical field of network links, and more particularly, to a link detecting method and system.

BACKGROUND

With the development of the economy and the Internet industry, currently, people are having increasingly higher requirements on the performance and the reliability of data centers. In the new data centers, integrated equipment cabinets have become the mainstream configuration. In other words, inside an equipment cabinet, there are a plurality of servers, a network-management switch, and a Top of Rack switch (TOR switch, which operates inside a server equipment cabinet, and is a switch that is used to connect a server inside the equipment cabinet and a higher-level network in data centers). The network-management switch is used to connect the network-management interfaces of all of the devices inside the equipment cabinet, to remotely control and manage the devices inside the equipment cabinet. The TOR switch is used to connect the service interfaces of all of the servers inside the equipment cabinet, to transmit the service information between the servers and the higher-level network. However, in practical applications, a failure may occur in a link (particularly, a network link) of the connection between the TOR switch and a server, which directly causes service interruption of the server, and directly causes an economic loss.

SUMMARY

An object of the present disclosure is to provide a link detecting method and system, which, by means of out-off-band communication, provides the required information for the fault detection, diagnosis, and so forth, of the links of the connection between the TOR switch and the servers, to realize effective monitoring on the corresponding links, which indirectly improves the reliability of the corresponding links, and prevents service interruption of the servers caused by the links a certain extent.

In order to achieve the above objects, the present disclosure provides the following technical solutions:

A link detecting method, wherein the link detecting method includes:
  acquiring, by a server-side program, connection relationships between service interfaces of a TOR switch and service interfaces of a plurality of servers, the server-side program is executed on any device, and client programs are executed on other devices except for the any device where the server-side program is executed on, wherein the devices include the TOR switch and a plurality of the servers;
  periodically sending, by the server-side program, via a network-management switch, a query message to each of the client programs;
  in response to the query message, by each of the client programs, returning interface information of service interfaces included in the device where the server-side program is executed on, and provided with a connection relationship between service interfaces of other devices, to the server-side program via the network-management switch; and
  reporting, by the server-side program, both of the interface information of the services interfaces included in the device where the server-side program is executed on, and provided with the connection relationship between the service interfaces of the other devices, and received interface information, to an upper-level program, to enable the upper-level program, based on the interface information, to analyze and realize a state of connection of a link with the connection relationship correspondingly.

According to an embodiment of the present disclosure, the link detecting method further includes:
  periodically switching, by the server-side program, via the network-management switch, a keep-alive message with each of the client programs, and when the keep-alive message sent by any one of the client programs is not received within a required duration, determining, by the server-side program, that a connection with the any one of the client programs that is capable of realizing information communication via the network-management switch is lost.

According to an embodiment of the present disclosure, acquiring, by the server-side program, connection relationships between the service interfaces of the TOR switch and the service interfaces of a plurality of the servers includes:
  sequentially shutting down, by the server-side program, each of the service interfaces included in the TOR switch, and after shutting down any one of the service interfaces of the TOR switch, the server-side program inquires a service interface of any one of the service interfaces that loses a connection via the network-management switch, and determines that the any one of the service interfaces of the shut-down TOR switch is provided with a connection relationship between the service interface of the any one of the servers that loses the connection.

According to an embodiment of the present disclosure, acquiring, by the server-side program, connection relationships between the service interfaces of the TOR switch and the service interfaces of a plurality of the servers includes:
  acquiring a predetermined connection-relationship table, by the server-side program, and acquiring the connection relationship between the service interfaces of the TOR switch and the service interfaces of each of the servers from the connection-relationship table.

According to an embodiment of the present disclosure, acquiring, by the server-side program, connection relationships between the service interfaces of the TOR switch and the service interfaces of a plurality of the servers includes:
  by the server-side program, via the network-management switch, inquiring MAC addresses of service interfaces of the devices where each of the client programs are located from the client programs, and establishing a correspondence relationship between the MAC addresses of the service interfaces of each of the servers that are inquired, and MAC addresses of the service interfaces of the TOR switch, to realize establishments of the connection relationships between the service interfaces of the TOR switch and the service interfaces of each of the servers.

According to an embodiment of the present disclosure, the link detecting method further includes:

when interface information of a service interface of any one of the servers is changed, and the any one of the servers executes the server-side program, reporting the interface information that is changed to the upper-level program by the server-side program, when the any one of the servers executes the client program, sending the interface information that is changed to the server-side program by the client program executed on the any one of the servers, and reporting the interface information that is changed to the upper-level program by the server-side program.

According to an embodiment of the present disclosure, the link detecting method further includes:

when communication occurs between the servers and the TOR switch, recording communication information corresponding to the communication to a communication log by the server-side program.

According to an embodiment of the present disclosure, each of the devices includes both of the server-side program and the client program, and at a same moment, merely the server-side program included in one of the devices is capable of normally executing, and all of the other devices except for the device where the server-side program is executed on, are capable of normally executing the client programs included therein.

A link detecting system, wherein the link detecting system includes a server-side program and a plurality of client programs, wherein the server-side program is executed on any one device, and client programs are executed on other devices except for the any device where the server-side program is executed on, wherein the devices include a TOR switch and a plurality of servers;

the server-side program is configured for, acquiring connection relationships between service interfaces of the TOR switch and service interfaces of a plurality of the servers; periodically sending, via a network-management switch, a query message to each of the client programs; and reporting both of interface information of service interfaces that are included therein and provided with a connection relationship between service interfaces of other devices and the received interface information to an upper-level program, to enable the upper-level program, based on the interface information, to analyze and realize a state of connection of a link with the connection relationship correspondingly; and each of the client programs is configured for, in response to the query message, returning interface information of service interfaces included in the device where the server-side program is executed on, and provided with the connection relationship between the service interfaces of the other devices, to the server-side program via the network-management switch.

The present disclosure provides a link detecting method and system, wherein the method includes: acquiring, by a server-side program, a connection relationship between service interfaces of a TOR switch and service interfaces of servers, wherein the server-side program is executed in any one device, and client programs are executed in other devices than the any one device, wherein the devices include the TOR switch and the servers; periodically sending, by the server-side program, via a network-management switch, a query message to each of the client programs; by each of the client programs, in response to the query message, returning interface information of service interfaces that are included in the device where the client program is located and have a connection relationship with service interfaces of another device to the server-side program via the network-management switch; and reporting, by the server-side program, both of interface information of service interfaces that are included in the device where the server-side program is located and provided with connection relationships with service interfaces of another device and the received interface information to an upper-level program, to enable the upper-level program to, based on the interface information, analyze a state of connection of a link that realizes a corresponding connection relationship. The present disclosure realizes the information communication between the server-side program and the client programs by using the network-management switch, and the server-side program and the client programs are executed in the corresponding TOR switch and/or servers, respectively, thereby acquiring the interface information of the service interfaces of each of the servers connected to the TOR switch in such a manner, to enable the upper-level program to, based on the interface information, realize the monitoring on the state of the connection of the corresponding to link, whereby the upper-level program may timely perform operations such as the corresponding link-failure treatment and link repairment when abnormality of a certain link connection is monitored. It can be seen that the present disclosure realizes the information communication between the TOR switch and the servers by using the network-management switch, even if a failure exists in a link of direct connection between the TOR switch and a server, the state of connection of the link between the TOR switch and the server may be obtained by using the network-management switch. Such a mode of out-off-band communication provides the required information for the fault detection, diagnosis, and so forth, of the corresponding links, to realize effective monitoring on the corresponding links, which indirectly improves the reliability of the corresponding links, and prevents service interruption of the servers caused by the links a certain extent.

BRIEF DESCRIPTION OF THE DRAWINGS

In order to more clearly illustrate the technical solutions of the embodiments of the present disclosure or the prior art, the figures that are required to describe the embodiments or the prior art will be briefly described below. Apparently, the figures that are described below are merely embodiments of the present disclosure, and a person skilled in the art may obtain other figures according to the provided figures without paying creative work.

DETAILED DESCRIPTION

The technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
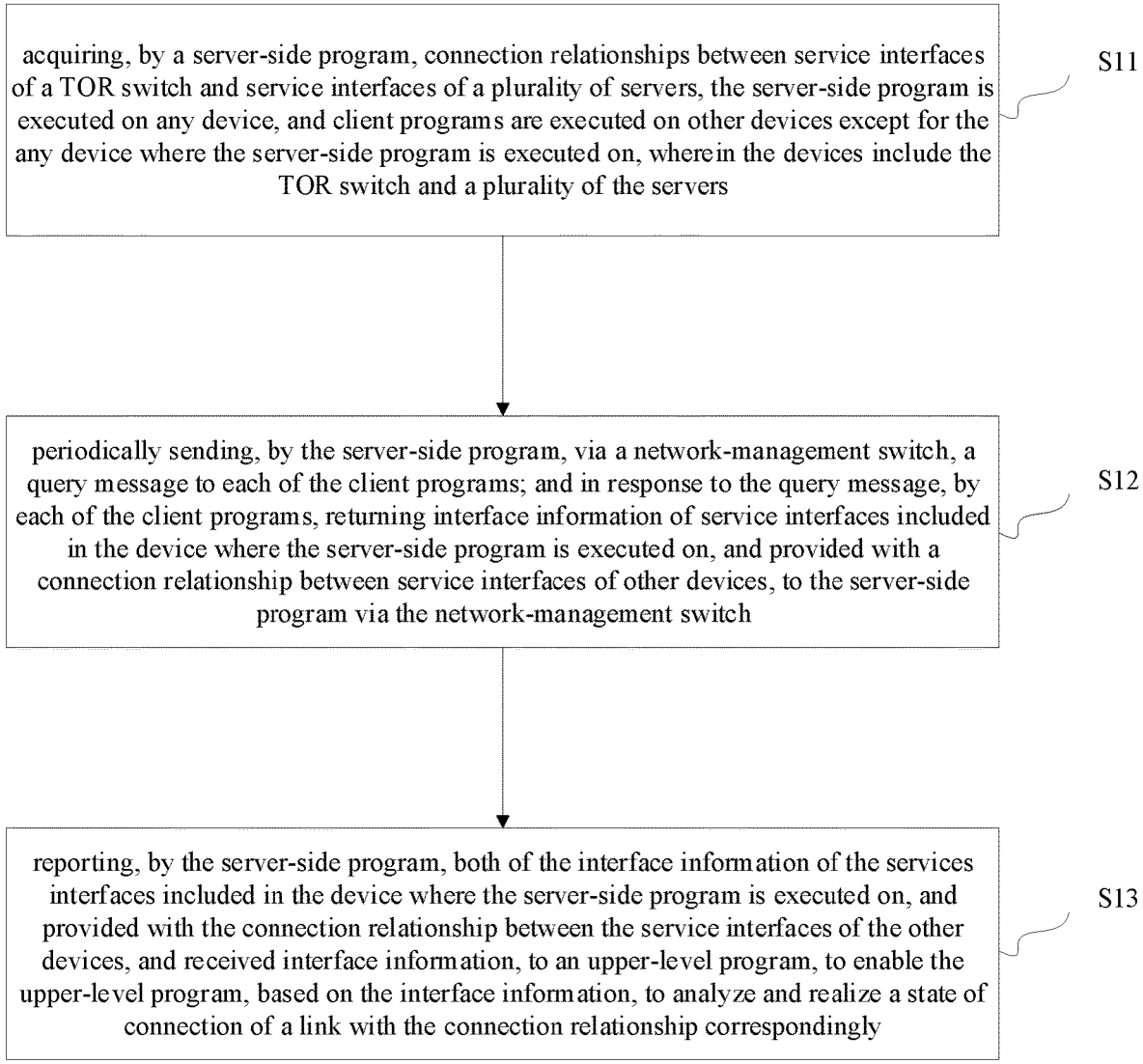
FIG. 1 is a flow chart of a link detecting method according to an embodiment of the present disclosure.

Referring to FIG. 1, FIG. 1 shows a flow chart of a link detecting method according to an embodiment of the present disclosure. The method may include:

S11: acquiring, by a server-side program, connection relationships between service interfaces of a TOR switch and service interfaces of a plurality of servers, the server-side program is executed on any device, and client programs are executed on other devices except for the any device where the server-side program is executed on, wherein the devices include the TOR switch and a plurality of the servers.

Figure 2:
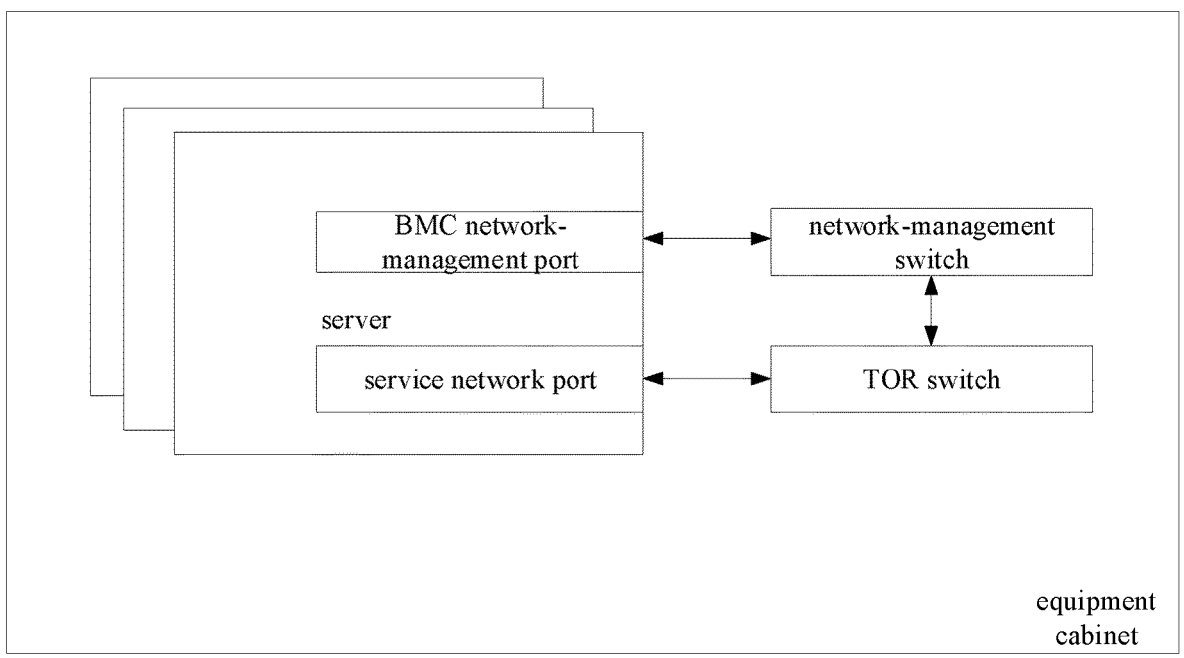
FIG. 2 is a schematic diagram of the program environment in the link detecting method according to an embodiment of the present disclosure.

The client programs and the server-side program according to the embodiment of the present disclosure may be executed in the TOR switch inside an integrated equipment cabinet and Baseboard Management Controller (BMC) chips of the corresponding servers. Taking the case as an example in which, the quantity of the servers is 1, the program environment of the client programs and the server-side program according to the embodiment of the present disclosure may be as shown in FIG. 2, wherein the service network interface serves as the service interface, and the BMC network-management port may be referred to for short as a network-management interface. The servers may communicate with the network-management switch via the network-management interface, and may also communicate with the TOR switch via the service interface. As corresponding to the service interfaces of the server, the TOR switch includes service interfaces connected to the service interfaces of the server, thereby, by the connection between the service interfaces of the two devices, forming the link for the communication between the two devices, which is a link designed to detect the connection of the server with the TOR switch via the service interfaces in the present disclosure. The server-side program acquires the connection relationship between the service interfaces of the TOR switch and the service interfaces of the server, which particularly refers to acquiring which one of the service interfaces of which of the servers is connected to each of the service interfaces of the TOR switch, respectively. Therefore, the service interfaces belonging to the TOR switch and the server, respectively, that forming a link between the TOR switch and the sever may be obtained throughout the connection relationship; in other words, the service interfaces belonging to two types of devices, respectively, and are interconnected with each other may be located.

In the embodiment of the present disclosure, the server-side program and the client programs that may communicate may be provided, the server-side program may communicate with each of the client programs via a network-management network provided by the network-management switch; in other words, it realizes the communication in such an out-of-band manner. Usually, among the TOR switch and the servers connected to the TOR switch via the service interfaces, merely one of the devices may execute the server-side program, and in this case the other of the devices are required to execute the client programs, therefore, via the communication between the server-side program and the client programs, realizing the monitoring on the service interfaces included in the servers and the TOR switch.

S12: periodically sending, by the server-side program, via a network-management switch, a query message to each of the client programs; and in response to the query message, by each of the client programs, returning interface information of service interfaces included in the device where the server-side program is executed on, and provided with a connection relationship between service interfaces of other devices, to the server-side program via the network-management switch.

After the connection relationships between the service interfaces belonging to the TOR switch and the servers are determined, respectively, the server-side program may periodically communicate with the client programs via the network-management network provided by the network-management switch, to acquire the interface state information of the service interfaces of the devices where the client programs are located (referred to for short as the interface information). The server-side program may periodically send to each of the client programs a communication message as the query message. The query message may be obtained by encapsulating sub-protocols based on a Transmission Control Protocol (TCP) message or a User Datagram Protocol (UDP) message. For example, it may include a protocol message content length, an interface serial number, an interface Media Access Control (MAC) address, a flag bit (an inquiring flag bit, a controlling flag bit or a feeding-back flag bit) and an instruction message (an inquiring control instruction or a feedback message). The client program, after receiving the query message including the inquiring flag bit, carries the inquired information in the communication message and feeds back to the server-side program. In the present disclosure, the inquired information refer to the interface information of the service interfaces that are included in the device where the client program receiving the query message is located and provided with a connection relationship between the service interfaces of the other devices. The interface information refer to the information that indicate the states of the corresponding service interfaces. Subsequently, it may be determined based on those information whether the state of the corresponding link is normal, i.e., whether the corresponding link is in the connecting state or the disconnecting state. For example, when a service interface is an Ethernet interface, the interface information may include the type of the physical transceiver, the supported speed, the medium type and so forth. Further, when the type of the physical transceiver is an optical module, the interface information may include information such as the received optical power, the emitted optical power, the temperature and whether the CDR is locked. All of the above-described information may be used to determine the state of the link. The principle of the determination on the state of the link corresponding to the interfaces based on the information indicating the interface state is the same as the principle of the implementation of the corresponding solutions in the prior art, and is not discussed herein further.

Furthermore, if the server-side program requires implementing the corresponding controlling operations, then it may send to each of the client programs a communication message as a control message. The client programs, after receiving the control message including a controlling flag bit, may perform the corresponding control actions according to the instruction by the control message, including but not limited to modifying the corresponding interface register, modifying the interface rate and modifying the operating mode of the interfaces (simplex/duplex/whether the energy saving mode is switched on), and, after the control actions are implemented, it may also send a feedback message with respect to whether the operations are successful to the server-side program. Moreover, the purpose of sending the feedback message is to enable the upper-level program to perform a correct strategy. For example, if it is detected that the connection at the interface link layer is broken, then it may be determined according to the received optical power whether a signal may be received, and if yes, it may be attempted to modify the operating mode of the link layer, to realize a capacity of automatic adaptation.

S13: reporting, by the server-side program, both of the interface information of the services interfaces included in the device where the server-side program is executed on, and provided with the connection relationship between the service interfaces of the other devices, and received interface information, to an upper-level program, to enable the upper-level program, based on the interface information, to analyze and realize a state of connection of a link with the connection relationship correspondingly.

The server-side program, after collecting the interface information of the service interfaces corresponding to the devices where the client programs are located, are further required to acquire the interface information of the service interfaces that are included therein and provided with a connection relationship between the service interfaces of the other devices, and subsequently report both of the interface information of itself and the collected interface information sent by the other client programs to the upper-level program, to enable the upper-level program to, based on all of the interface information, determine whether the links between each pair of the service interfaces including the connection relationship are in the state of normal connection, so as to timely perform the corresponding treatments such as repairment when abnormality such as disconnection occurs in the links.

The present disclosure realizes the information communication between the server-side program and the client programs by using the network-management switch, and the server-side program and the client programs are executed in the corresponding TOR switch and/or servers, respectively, thereby acquiring the interface information of the service interfaces of each of the servers connected to the TOR switch in such a manner, to enable the upper-level program to, based on the interface information, realize the monitoring on the state of the connection of the corresponding to link. Therefore, the upper-level program may timely perform operations such as the corresponding link-failure treatment and link repairment when abnormality of a certain link connection is monitored. It can be seen that the present disclosure realizes the information communication between the TOR switch and the servers by using the network-management switch, even if link failure in a direct connection between the TOR switch and a server occurs, the state of connection of the link between the TOR switch and the server may be known by using the network-management switch. Such a mode of out-off-band communication provides the required information for the fault detection, diagnosis, and so forth, of the corresponding links, to realize effective monitoring on the corresponding links, which indirectly improves the reliability of the corresponding links, and prevents service interruption of the servers caused by the links a certain extent.

The link detecting method according to an embodiment of the present disclosure may further include:

periodically switching, by the server-side program, via the network-management switch, a keep-alive message with each of the client programs, and when the keep-alive message sent by any one of the client programs is not received within a required duration, determining, by the server-side program, that a connection with the any one of the client programs that is capable of realizing information communication via the network-management switch is lost.

It should be noted that, while the server-side program is periodically acquiring the interface information of the service interfaces of the devices where the client programs are located, the server-side program may also periodically switch keep-alive messages with the client programs via the network-management network provided by the network-management switch. Particularly, the server-side program periodically sends a keep-alive message to each of the client programs via the network-management switch, and each of the client programs returns the keep-alive message to the server-side program after receiving the keep-alive message, by using such a manner, it is determined whether the server-side program and the corresponding client program are in the state in which they may normally communicate via the network-management switch. If within a preset time period (a required duration, which may be set according to practical demands) after the server-side program sends the keep-alive message, it does not receive a keep-alive message returned by any one of the client programs, then it is determined that the connection between the any one of the client programs and the server-side program is lost, and the communication between the any one of the client programs and the server-side program may not be continued, which may realize the monitoring on the connections between the client programs and the server-side program in real time, therefore, it is facilitate timely performing operations such as a connection repairment when the connection is monitored as lost.

In order to further facilitate acquiring the state of connection between the client programs and the server-side program, after the connection between any one of the client programs and the server-side program is monitored as lost, such a condition may also be reported to the upper-level program, so as to realize the timely reporting of the abnormality.

Furthermore, before the server-side program and the client programs do not starting any communication therebetween, in order to realize an establishment of the communicative connection between the server-side program and the client programs, the server-side program may read an MAC table stored in the network-management switch, and acquire MAC addresses of the devices connected to all of the interfaces except for an uplink interface, which are the MAC addresses of the devices where all of the client programs are located, and accordingly access the client programs that are executed on each of the devices throughout the MAC addresses, to continuously switch the keep-alive messages with the client programs at a time interval that is preset according to practical demands (periodically). If the server-side program receives the keep-alive messages sent by a client program for consecutively n times (which may be set according to practical demands, for example, 2 times, 3 times and so forth), then it is considered that the communicative connection with the client program are established. The time interval may be referred to as a period, the preset time period may be 2 periods, and the keep-alive message may particularly include the information of the priority of the device where the server-side program or the client program sending the keep-alive message is located and the information of the period. Furthermore, the server-side program, after receiving the keep-alive message sent by the client, further determines whether the keep-alive message is correct. If it is correct, then the server-side program determines that the keep-alive message sent by the client program is received. If it is not correct, then the server-side program considers that the keep-alive message sent by the client program is not received. Moreover, the determination whether the keep-alive message is correct may be performed according to any rule predetermined according to practical demands. For example, by determining whether the information included in the keep-alive message are the required information (for example, the information of the priority, the information of the period, and so forth), which is not particularly limited herein.

In the link detecting method according to an embodiment of the present disclosure, acquiring, by the server-side program, the connection relationships between the service interfaces of the TOR switch and the service interfaces of the servers may include:

sequentially shutting down, by the server-side program, each of the service interfaces included in the TOR switch, and after shutting down any one of the service interfaces of the TOR switch, the server-side program inquires a service interface of any one of the service interfaces that loses a connection via the network-management switch, and determines that the any one of the service interfaces of the shut-down TOR switch is provided with a connection relationship between the service interface of the any one of the servers that loses the connection.

In order to acquire the connection relationships between the service interfaces that operate in the TOR switch and the servers, respectively, the method may include controlling to sequentially shut down the service interfaces included in the TOR switch, and after any one of the service interfaces is shut down, via the network-management switch, inquiring whether a service interface lost connection exists in each of the servers. If yes, it is determined that a connection relationship exists between the service interface and the service interface currently shut down. Accordingly, such a mode may accurately determine the connection relationship by using a simple operation.

In the link detecting method according to an embodiment of the present disclosure, the step of acquiring, by the server-side program, the connection relationship between the service interfaces of the TOR switch and the service interfaces of the servers includes:

acquiring a predetermined connection-relationship table, by the server-side program, and acquiring the connection relationship between the service interfaces of the TOR switch and the service interfaces of each of the servers from the connection-relationship table.

The method may include pre-defining the correspondence relationship between the service interfaces that operate in the TOR switch and the servers, respectively, and realizing the connection between the service interfaces according to the correspondence relationship (setting the MAC addresses of the service interfaces of the servers according to the correspondence relationship). Furthermore, the connection-relationship table including the correspondence relationship may be stored in the network-management network or another location that the server-side program may access, therefore, the server-side program may obtain the connection relationship between the service interfaces of the TOR switch and the service interfaces of the servers by merely accessing the connection-relationship table. The implementation of the connection relationship using such a mode may satisfy the current practical demands, and the acquirement of the connection relationship is simple and easy to implement.

In addition, the method may also include pre-defining the connection and correspondence relationship between the interfaces included in the network-management switch and the servers, and the connection and correspondence relationship between the interfaces included in the network-management switch and the TOR switch, and storing those correspondence relationships into the corresponding tables. Certainly, those tables may also be the above-described connection-relationship table.

In the link detecting method according to an embodiment of the present disclosure, the step of acquiring, by the server-side program, the connection relationship between the service interfaces of the TOR switch and the service interfaces of the servers may include:

by the server-side program, via the network-management switch, inquiring MAC addresses of service interfaces of the devices where each of the client programs are located from the client programs, and establishing a correspondence relationship between the MAC addresses of the service interfaces of each of the servers that are inquired, and MAC addresses of the service interfaces of the TOR switch, to realize establishments of the connection relationships between the service interfaces of the TOR switch and the service interfaces of each of the servers.

The server-side program may send a broadcast message via the network-management switch, and acquire the IP addresses of the devices where the client programs are located returned by the client programs in response to the broadcast message. The server-side program, based on the IP addresses of the client programs, sends address requesting messages to the corresponding client programs, and receives the messages containing the MAC addresses of the service interfaces of the devices where the client programs are located returned by the client programs, thereby acquiring the MAC addresses of the service interfaces of the devices (each of the service interfaces has an MAC address corresponding to merely itself). After the MAC addresses of the service interfaces included in all of the servers and the TOR switch are acquired in such a manner, the connection relationship between the service interfaces of the TOR switch and the service interfaces of the servers may be established by establishing the correspondence relationship between the MAC addresses. In other words, if a pair of MAC addresses with a correspondence relationship and belonging to the service interfaces of the TOR switch and the serves, respectively, are provided with correspondence relationships therebetween, then the service interfaces corresponding to that pair of MAC addresses have a connection relationships therebetween, which conveniently and accurately realizes the determination of the connection relationship.

The link detecting method according to an embodiment of the present disclosure may further include:

when interface information of a service interface of any one of the servers are changed, if the any one of the servers executes the server-side program, by the server-side program, reporting the interface information that are changed to the upper-level program, and if the any one of the servers executes the client program, by the client program executed by the any one of the servers, sending the interface information that are changed to the server-side program, and, by the server-side program, reporting the interface information that are changed to the upper-level program.

In order to further timely acquire the interface information of the service interfaces, in an embodiment of the present disclosure, when the interface information of a service interface of any one of the servers are changed, the server-side program actively reports the interface information that are changed to the upper-level program. Furthermore, if the any one of the servers executes the server-side program, then the server-side program directly reports the interface information that are changed, and if the any one of the servers executes the client program, then the client programs sends the interface information that are changed to the server-side program, and the server-side program reports the interface information that are changed.

The link detecting method according to an embodiment of the present disclosure may further include:

when communication occurs between the servers and the TOR switch, recording communication information corresponding to the communication to a communication log by the server-side program.

The server-side program may also monitor the communication between the servers and the TOR switch in real time, and subsequently record the corresponding communication information into a communication log, for late-stage inquiry when required. The communication between the servers and the TOR switch may include the communication via the network-management switch, and may also include the communication via the links between the service interfaces, both of which are within the protection scope of the present disclosure.

In the link detecting method according to an embodiment of the present disclosure, each of the devices includes both of the server-side program and the client program, and at a same moment, merely the server-side program included in one of the devices is capable of normally executing, and all of the other devices except for the device where the server-side program is executed on, are capable of normally executing the client programs included therein.

It should be noted that all of the "executing" or "normally executing" according to the present disclosure may be in the activation state. In other words, at the same one moment, merely the server-side program included in one of the devices is capable of being in the activation state, and is executed to perform the corresponding function, and the other of the devices are required to execute the client program, to realize the communication between the TOR switch and the servers by using the communication between the server-side program and the client programs. Furthermore, the reason of why each of the devices is provided with the server-side program and the client program is that, if a certain device fails to activate the server-side program included therein, then another device may activate the server-side program included therein, therefore the backing-up of the server-side program may be realized, so as to realize a high reliability of the link detection. In an implementation, the device in which the server-side program is activated may be determined according to the priorities of the devices. The TOR switch may be configured to be provided with the highest priority, therefore, usually the server-side program included in the TOR switch is activated firstly. If the server-side program included in the TOR switch is successfully activated, then it is not required to further activate the server-side programs included in the other devices. If the activation on the server-side program included in the TOR switch fails, then the server-side program included in the server including the highest priority among the servers is activated. If it is successfully activated, then it is not required to further activate the server-side programs included in the other devices. If it is not successfully activated, then the server-side program included in the server including the second highest priority among the servers is activated. The rest may be done in the same manner. Moreover, when the devices where all of the non-activated server-side programs are located are identifying the device in which the server-side program should be activated, any one of the devices may periodically detect whether the network-management network includes a keep-alive message (the same as the above-described keep-alive message), wherein the keep-alive message includes the information of the priority of the device where the currently activated server-side program is located. If the priority of the device where the currently activated server-side program is located is lower than the priority of the any one of the devices, then the any one of the devices determines that the priority of itself is higher, and thus activates the server-side program included in itself. If not, the any one of the devices determines that the priority of itself is lower, and the server-side program included in itself is not required to be activated.

In a particular application scene, the implementation of the link detecting method according to an embodiment of the present disclosure may particularly include:

1. The server-side program, after activated, reads the MAC table of the network-management switch, acquires the MAC addresses of the devices connected to all of the interfaces except for the uplink interface, accesses by using the MAC addresses the client programs that are executed in the BMC of each of the devices, and switches the keep-alive messages uninterruptedly at the pre-defined time interval. When the server-side program receives the correct keep-alive messages for consecutively two times, then it is deemed that the connection is established, and if the keep-alive message is not received within a duration that exceeds two times the pre-defined period of the sending of the keep-alive messages, then it is deemed that the connection is lost. The content of the keep-alive message may include the information of the priority of the device, the period of the switching of the keep-alive message, and so forth.

2. The connection relationships between the service interfaces of the TOR switch and the IP addresses (Internet Protocol Address, or the service ports of the servers) of the BMCs of the servers connected to the service interfaces are determined. The connection relationships may be recorded by using a connection-relationship table, and the connection-relationship table may record the serial numbers of the service interfaces of the TOR switch, the BMCIP addresses corresponding to the servers connected to the service interfaces, the serial numbers of the service interfaces of the servers that are connected to the service interfaces, the MAC addresses of the service interfaces of the servers that are connected to the service interfaces, and so forth. The connection relationship may also be obtained by inquiring the MAC addresses of the service interfaces of the servers, comparing with the MAC table of the TOR switch, and identifying the connection relationship between the service interfaces of the servers that are accessed by using different IPs and the service interfaces of the TOR switch. The connection relationships may also be obtained by shutting down each of the service interfaces of the TOR switch, reading mainframe information (existing in the network-management switch) via a management channel, and searching for the service interfaces of the servers that are also disconnected, thereby finally determining the connection relationships between the service interfaces of the TOR switch and the service interfaces of the servers.

3. The server-side program inquires the interface information of the service interfaces of the devices where all of the client programs that establish the connection are located by using communication messages at a pre-set period, and may send control-instruction messages via the communication messages. Besides the periodical inquiring, when the state of the service interfaces of the servers change, the state is actively reported to the upper-level program.
4. The period of the inquiring may be a period set according to the time, and may also be triggered by an interruption event and immediately transmitted without waiting. The interruption event includes but is not limited to the change of the interface information. The server-side program records all of the communication logs. Furthermore, the links according to the present disclosure include but are not limited to an Ethernet link, Fibre Channel and InfiniBand.

The technical solutions according to the present disclosure may be used for link information switch and link control, to provide out-of-band functions of link negotiation and fault diagnosis. Moreover, the connection relationships between the service interfaces of the TOR switch and the service interfaces of the servers inside the integrated equipment cabinet may be identified, whereby the TOR switch obtains the IP addresses of the BMC network management ports of the servers connected to each of the service interfaces, which improves the reliability of the system, and prevents the disadvantage that traditional protocols such as AN and LLDP operate in band and are unusable in link failure. Furthermore, based on the technical solutions according to the present disclosure, functions such as the negotiation of the link connection mode, state synchronization, automatic energy saving, flow control and link failure diagnosis may be realized, which improves the reliability of the links between the servers and the TOR switch in the information center, increases the diagnosis efficiency, reduces the duration of failure recovery, and creates objective economic benefit.

Figure 3:
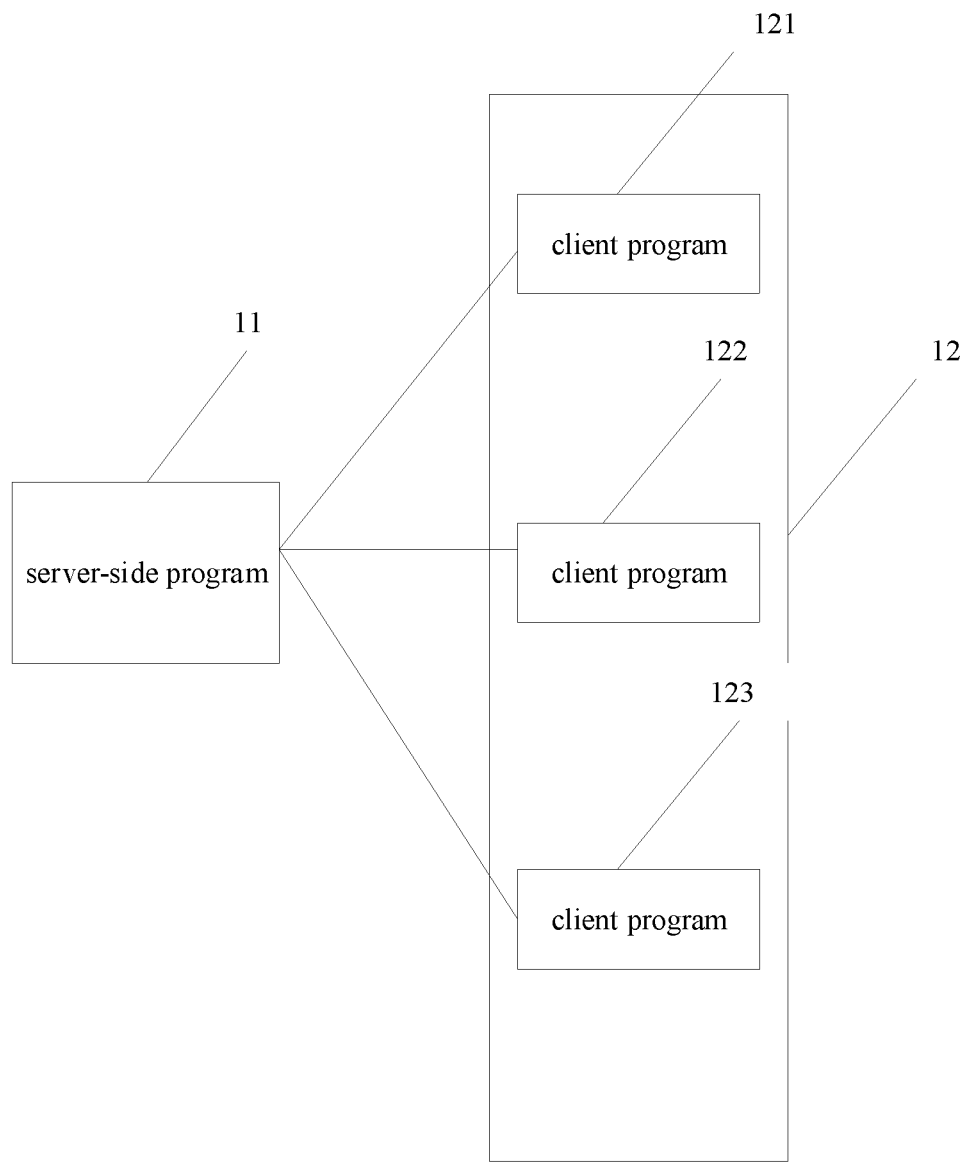
FIG. 3 is a schematic structural diagram of the link detecting apparatus according to an embodiment of the present disclosure.

An embodiment of the present disclosure further provides a link detecting system. as shown in FIG. 3, the link detecting system includes a server-side program 11 and a plurality of client programs 12 (FIG. 3 illustrates by taking the case as an example in which the quantity of the client programs is 3, which are denoted as 121, 122 and 123), wherein the server-side program 11 is executed in any one device, and the client programs 12 are executed in other devices than the any one device, wherein the devices include a TOR switch and servers.

the server-side program 11 is configured for, acquiring connection relationships between service interfaces of the TOR switch and service interfaces of a plurality of the servers; periodically sending, via a network-management switch, a query message to each of the client programs 12; and reporting both of interface information of service interfaces that are included therein and provided with a connection relationship between service interfaces of other devices and the received interface information to an upper-level program, to enable the upper-level program, based on the interface information, to analyze and realize a state of connection of a link with the connection relationship correspondingly.

Each of the client programs 12 is configured for, in response to the query message, returning interface information of service interfaces included in the device where the server-side program is executed on, and provided with the connection relationship between the service interfaces of the other devices, to the server-side program 11 via the network-management switch.

It should be noted that the description on the related part of the link detecting system according to the embodiments of the present disclosure may refer to the detailed description on the corresponding part in the link detecting method according to the embodiments of the present disclosure, and is not discussed herein further. Furthermore, the parts of the above technical solutions according to the embodiments of the present disclosure that have the same principles of implementation as those of the corresponding technical solutions in the prior art are not described in detail, to avoid excessively replicated description.

The above description on the disclosed embodiments enables a person skilled in the art to implement or use the present disclosure. Various modifications on those embodiments will be apparent to a person skilled in the art, and the general principle defined herein may be implemented in other embodiments without departing from the spirit or scope of the present disclosure. Therefore, the present disclosure should not be limited to the embodiments illustrated herein, but should meet the broadest scope in accord with the principle and the novel characteristics disclosed herein.

The invention claimed is:

1. A link detecting method, comprising:
acquiring, by a server-side program, connection relationships between service interfaces of a TOR switch and service interfaces of a plurality of servers, wherein the server-side program is executed on any device, client programs are executed on other devices except for the any device where the server-side program is executed on, and the devices comprise the TOR switch and a plurality of the servers;
periodically sending, by the server-side program, via a network-management switch, a query message to each of the client programs;
in response to the query message, by each of the client programs, returning interface information of service interfaces that are comprised in the device where the client program receiving the query message is located, and are provided with a connection relationship between service interfaces of other devices, to the server-side program via the network-management switch; and
obtaining, by the server-side program, the interface information of the services interfaces that are comprised in the device where the server-side program is executed on, and are provided with the connection relationship between the service interfaces of the other devices, as well as the interface information received from each of the client programs, and analyzing, based on the interface information obtained, a state of connection of a link realizing a corresponding connection relationship;
wherein each of the devices comprises both of the server-side program and the client program, and at a same moment, merely one of the devices is configured to execute the server-side program comprised therein, and all of the other devices except for the device where the server-side program is executed on, are configured to execute the client programs comprised therein,
wherein the query message is obtained based on a Transmission Control Protocol message or a User Datagram Protocol message.

2. The link detecting method according to claim 1, further comprising:

periodically switching, by the server-side program, via the network-management switch, a keep-alive message with each of the client programs by:

periodically sending, by the server-side program, a keep-alive message to each of the client programs via the network-management switch, and returning, by each of the client programs, the keep-alive message to the server-side program after receiving the keep-alive message, to determine whether the server-side program and the corresponding client program are in a state where they are configured to communicate via the network-management switch, wherein under the condition that the keep-alive message sent by any one of the client programs is not received within a required duration, determining, by the server-side program, that a connection with the any one of the client programs that is configured to realize information communication via the network-management switch is lost.

3. The link detecting method according to claim 2, wherein acquiring, by the server-side program, connection relationships between the service interfaces of the TOR switch and the service interfaces of a plurality of the servers comprises:

sequentially shutting down, by the server-side program, each of the service interfaces comprised in the TOR switch, and after shutting down any one of the service interfaces of the TOR switch, the server-side program inquires a service interface of any one of the service interfaces that loses a connection via the network-management switch, and determines that the any one of the service interfaces of the shut-down TOR switch is provided with a connection relationship between the service interface of the any one of the servers that loses the connection.

4. The link detecting method according to claim 2, wherein acquiring, by the server-side program, connection relationships between the service interfaces of the TOR switch and the service interfaces of a plurality of the servers comprises:

acquiring a predetermined connection-relationship table, by the server-side program, and acquiring the connection relationship between the service interfaces of the TOR switch and the service interfaces of each of the servers from the connection-relationship table.

5. The link detecting method according to claim 2, wherein acquiring, by the server-side program, connection relationships between the service interfaces of the TOR switch and the service interfaces of a plurality of the servers comprises:

by the server-side program, via the network-management switch, inquiring MAC addresses of service interfaces of the devices where each of the client programs are located from the client programs, and establishing a correspondence relationship between the MAC addresses of the service interfaces of each of the servers that are inquired, and MAC addresses of the service interfaces of the TOR switch, to realize establishments of the connection relationships between the service interfaces of the TOR switch and the service interfaces of each of the servers.

6. The link detecting method according to claim 1, wherein the link detecting method further comprises:

when interface information of a service interface of any one of the servers is changed, obtaining, by the server-side program, the interface information that is changed.

7. The link detecting method according to claim 6, wherein the link detecting method further comprises:

on the condition that communication occurs between the servers and the TOR switch, recording communication information corresponding to the communication to a communication log by the server-side program.

8. A link detecting system, wherein the link detecting system comprises a server-side program and a plurality of client programs, wherein the server-side program is executed on any one device, and client programs are executed on other devices except for the any device where the server-side program is executed on, wherein the devices comprise a TOR switch and a plurality of servers;

the server-side program is configured for, acquiring connection relationships between service interfaces of the TOR switch and service interfaces of a plurality of the servers; periodically sending, via a network-management switch, a query message to each of the client programs; and obtaining interface information of service interfaces that are comprised therein and provided with a connection relationship between service interfaces of other devices as well as the interface information received from each of the client programs, and analyzing, based on the interface information obtained, a state of connection of a link realizing a corresponding connection relationship; and each of the client programs is configured for, in response to the query message, returning interface information of service interfaces that are comprised in the device where the client program receiving the query message is located, and are provided with the connection relationship between the service interfaces of the other devices, to the server-side program via the network-management switch;

wherein each of the devices comprises both of the server-side program and the client program, and at a same moment, merely one of the devices is configured to execute the server-side program comprised therein, and all of the other devices except for the device where the server-side program is executed on, are configured to execute the client programs comprised therein, wherein the query message is obtained based on a Transmission Control Protocol message or a User Datagram Protocol message.

9. The method according to claim 1, wherein the server-side program communicates with each of the client programs via a network-management network provided by the network-management switch.

10. The method according to claim 1, wherein the query message includes a protocol message content length, an interface serial number, an interface Media Access Control address, a flag bit and an instruction message.

11. The method according to claim 1, wherein the interface information refer to information that indicate the states of corresponding service interfaces.

12. The method according to claim 5, wherein the step of by the server-side program, via the network-management switch, inquiring MAC addresses of service interfaces of the devices where each of the client programs are located from the client programs comprises:

sending, by the server-side program, a broadcast message via the network-management switch, and acquiring the IP addresses of the devices where the client programs are located returned by the client programs in response to the broadcast message;

by the server-side program, based on the IP addresses of the client programs, sending address requesting messages to the corresponding client programs, and receiving the messages containing the MAC addresses of the service interfaces of the devices where the client programs are located returned by the client programs, to acquire the MAC addresses of the service interfaces of the devices.

13. The method according to claim 7, wherein the communication between the servers and the TOR switch comprises the communication via the network-management switch, and the communication via the links between the service interfaces.

14. The method according to claim 1, wherein merely one of the devices being configured to execute the server-side program comprised therein refers to that merely the server-side program comprised in one of the devices is in the activation state.

* * * * *